United States Patent [19]

Giacopelli et al.

[11] 4,233,147
[45] Nov. 11, 1980

[54] MEMBRANE CELL WITH AN ELECTRODE FOR THE PRODUCTION OF A GAS

[75] Inventors: Umberto Giacopelli; Bruno Grassi, both of Rosignano-Solvay, Italy; René Crabbé, Brussels, Belgium

[73] Assignee: Solvay & Cie., Brussels, Belgium

[21] Appl. No.: 58,367

[22] Filed: Jul. 17, 1979

Related U.S. Application Data

[63] Continuation of Ser. No. 930,239, Aug. 2, 1978, abandoned, which is a continuation of Ser. No. 772,563, Feb. 28, 1977, abandoned.

[30] Foreign Application Priority Data

Mar. 8, 1976 [FR] France .................. 76 06764

[51] Int. Cl.³ .............................................. C25B 9/00
[52] U.S. Cl. .................... 204/266; 204/258; 204/283
[58] Field of Search ............... 204/258, 266, 283, 284, 204/278; 429/209

[56] References Cited

U.S. PATENT DOCUMENTS

| 1,855,495 | 5/1928 | Stuart | 220/1 R |
|---|---|---|---|
| 2,682,505 | 6/1954 | Greco | 204/284 |
| 3,168,458 | 2/1965 | Sprague | 204/283 X |
| 3,361,656 | 1/1968 | Miller | 204/283 X |
| 3,930,981 | 1/1976 | De Nora et al. | 204/283 X |

FOREIGN PATENT DOCUMENTS

| 769677 | 7/1971 | Belgium . |
|---|---|---|
| 769680 | 7/1971 | Belgium . |
| 773918 | 10/1971 | Belgium . |
| 784255 | 6/1972 | Belgium . |
| 785605 | 6/1972 | Belgium . |
| 794889 | 2/1973 | Belgium . |
| 800949 | 7/1973 | Belgium . |
| 806280 | 10/1973 | Belgium . |
| 814510 | 5/1974 | Belgium . |
| 817675 | 7/1974 | Belgium . |
| 817676 | 7/1974 | Belgium . |
| 817677 | 7/1974 | Belgium . |
| 2070757 | 12/1970 | France . |

*Primary Examiner*—Charles F. LeFevour
*Attorney, Agent, or Firm*—Robert E. Burns; Emmanuel J. Lobato; Bruce L. Adams

[57] ABSTRACT

An electrode for the production of gas in an electrolytic cell of the membrane type with substantially vertical electrodes. The electrode is a substantially vertical conducting plate having a horizontal zone for connecting it to a current lead and is pierced by apertures for the evolution of a gas. Oblique vanes project from the plate opposite the apertures. The apertures are substantially vertically extending slots and the vanes are elongated extending from an active face of the electrode and are arranged adjacent the vertical slots.

7 Claims, 10 Drawing Figures

MEMBRANE CELL WITH AN ELECTRODE FOR THE PRODUCTION OF A GAS

This is a continuation of application Ser. No. 930,239, filed Aug. 2, 1978 which is a continuation of application Ser. No. 772,563, filed Feb. 28, 1977, both abandoned.

BACKGROUND OF THE INVENTION

The present invention relates to improving electrodes intended for electrolytic cells of the membrane type with vertical electrodes.

More particularly the invention relates to an electrode for an electrolytic cell of the membrane type, wherein one electrode is disposed vertically, is connected to an electric current lead along a horizontal zone, for example along its lower or upper edge zone, and is the seat of gas liberation. This electrode may be for example an anode or a cathode of a diaphragm cell for the electrolysis of water or of an aqueous solution of alkali metal halide or hydrochloric acid. A major difficulty met with in the design and use of electrolytic cells of the membrane type, with vertical electrodes, lies in the need to ensure regular evacuation of the gases (for example chlorine, oxygen or hydrogen) produced at the electrodes, in the body of the electrolyte. The presence of gas in the electrolyte, between the electrodes, in effect lowers noticeably the electrical conductivity of the electrolyte and, in consequence, lowers the energy yield of electrolysis.

Moreover, the upward motion of the gas in the electrolyte causes turbulence in the flow of electrolyte through the cell. A turbulent electrolyte flow has the disadvantage of subjecting the membrane to severe mechanical stresses. In order to avoid accelerated deterioration of the membrane, it is generally necessary to limit the height of the electrodes, to provide a wide spacing between the anodes and the cathodes of the cell and to limit the electrical current density, which is unfavourable both to the energy yield of the electrolytic cell and its productivity.

In order to diminish the aforesaid disadvantage of membrane cells with vertical electrodes, it has been proposed in French Pat. No. 2070757 of Nippon Soda Company Ltd., of Dec. 4, 1970, to utilize hollow anodes formed of metal plates, pierced by apertures and provided with horizontal gas deflectors sloping downwards, above the apertures, so as to direct the gas behind the plates.

These known foraminate anodes have, however, the disadvantage of possessing a very high electrical resistance. It is for this reason that, although they permit a noticeable reduction of the loss by Joule effect through the electrolyte in membrane cells, this advantage is largely offset by the disadvantage inherent in the excessive electrical resistance of these known foraminate anodes. Moreover, this very high electrical resistance necessitates a reduction in the height of the anodes so as to avoid an excessive potential gradient.

It has furthermore been found, in practice, that in membrane cells equipped with known foraminate anodes of this type the membranes tend to suffer accelerated and non-uniform deterioration, which can lead to local puncturing of the membranes.

SUMMARY OF THE INVENTION

The invention aims to overcome all the aforesaid disadvantages of the known electrodes.

The invention relates, therefore, to an electrode for the production of a gas in an electrolytic cell of the membrane type, which has substantially vertical electrodes, the said electrode comprising a substantially vertical conducting plate, which is pierced by apertures and which comprises a horizontal zone for connecting it to a current lead. According to the invention, the apertures comprise substantially vertical slots, and substantially vertical vanes are arranged along the slots and are turned obliquely with respect to the electrode plate so as to project in front of the plate, opposite the slots.

By "horizontal zone" of the plate is meant a strip along the length of which the plate may be connected to a current lead. This horizontal zone may for example comprise the lower marginal zone of the plate or its upper marginal zone. As an alternative, the horizontal zone may also comprise a central horizontal zone of the plate.

In the electrode according to the invention, the vertical slots are narrow apertures extended in the vertical direction, the height of which is at least twice the width. The height of the slots is advantageously equal to at least five times, preferably at least seven times, their width. Preferably, the vertical slots are distributed substantially uniformly over the whole width of the plate.

By width of the plate or the slots is meant the dimension of these in the direction parallel to the aforesaid horizontal zone of the plate.

In the electrode according to the invention, the vertical slots delimit between them continuous bands of metal which extend over substantially the whole height of the plate. The width of these vertical bands is advantageously between one and four times the width of the slots.

In the electrode according to the invention, the optimum inclination of the vanes depends, in general, on the dimensions of the slots and the thickness of the conducting plate. It is advantageously set so that the vanes make an angle with respect to the general plane of the plate substantially between 10 and 80 degrees, preferably between 30 and 70 degrees.

All other things being equal, the electrode according to the invention has the advantage of an electrical resistance considerably lower than the known foraminate electrodes described above, which is particularly favorable to the energy yield of the cell. From this also stems the possibility of making the electrodes of greater height.

Furthermore, the electrode according to the invention ensures easy and rapid evacuation of the gas produced at its surface, which feature confers the supplementary advantage of allowing a significant reduction in the anode-cathode distance of membrane cells and, all other things being equal, a reduction in the electrical resistance of the electrolyte in the cell.

The electrode according to the invention thus provides the advantage of increasing the energy yield of membrane cells and permitting in these cells at one and the same time higher current densities, shorter anode-cathode distances and electrodes of greater height. These last three advantages have the profitable consequence of considerably increasing the productive capacity of membrane cells for the same floor space.

It has moreover been observed that use of the electrode according to the invention in electrolytic cells of the membrane type had the beneficial effect of increasing appreciably the life of membranes, particularly of asbestos diaphragms.

The electrode according to the invention finds an interesting application as the anode of a membrane cell for the electrolysis of water, an aqueous solution of hydrochloric acid or an aqueous solution of alkali metal chloride. In this last specific application, the anode may advantageously be made in known manner, starting from a metal plate made of a material selected from the group consisting of titanium, tantalum, tungsten, niobium, zirconium and alloys of these metals, the plate carrying, on its surface which faces towards the vanes, a conducting coating made of a material selected from the group consisting of platinum, iridium, osmium, palladium, rhodium, ruthenium, the alloys of these metals, and compounds, for example the oxides, of these metals. By way of example, the conducting coating of the electrode according to the invention may advantageously comprise one of the coatings described in Belgian Pat. No. 769677 of July 8, 1971, Belgian Pat. No. 769680 of July 8, 1971, Belgian Pat. No. 784255 of June 1, 1972 and Belgian Pat. No. 785605 of June 29, 1972, all four in the name of the present applicant.

As a modification, the electrode according to the invention can also be suitable as a cathode of a membrane cell for the electrolysis of water, of a solution of hydrochloric acid or of a solution of alkali metal halide and, in this particular case, the plate may for example be made of steel, of nickel or of an alloy of one of these metals.

In the membrane cell, equipped with electrodes according to the invention, by "membrane" is meant a diaphragm permeable to the electrolyte, made of an inert material, or a perm-selective membrane.

Example of known diaphragms include diaphragms of asbestos, such as those described in U.S. Pat. No. 1,855,495 of May 7, 1926 in the name of Stuart and in Belgian Pat. No. 773918 of Oct. 14, 1971 in the name of the present applicant, porous sheets formed from a mixture of asbestos and fibrils of polyvinylidene fluoride, such as those described and claimed in Belgian Pat. No. 800949 of July 15, 1973 and Belgian Pat. No. 814510 of May 3, 1974, in the name of the present applicant, and porous sheets of polytetrafluoroethylene, such as those described in Belgian Pat. No. 794889 of Feb. 2, 1973, Belgian Pat. Nos. 817675, 817676 and 817677 of July 15, 1974, in the name of Imperial Chemical Industries Ltd.

By "a perm-selective membrane" is meant a thin non-porous membrane, comprising an ion-exchange material. Examples of perm-selective membranes suitable for brine-electrolysis cells include cationic membranes containing $SO_3^-$ groups and resulting from co-polymerization of tetrafluoroethylene and sulphonated perfluorovinyl ether, such as the membranes known under the name NAFION (E. I. Du Pont de Nemours and Co.).

In one particular embodiment of the electrode according to the invention, the electrode is made of a sheet of expanded metal. In this embodiment of the electrode according to the invention the angle of inclination of the vanes is imposed by the conditions of drawing out the sheet, which fix the width of the slots. It is convenient to control this inclination so that the depth of the slots is equal to at least the thickness of the plate and preferably equal to 1.2 times this thickness.

In another embodiment of the electrode according to the invention, suitable more particularly for membrane cells with multiple electrodes, the electrode according to the invention has the form of a hollow box, the aforesaid vertical conducting plate, pierced by vertical slots and provided with vertical vanes, being for this purpose set opposite a similar symmetrical conducting plate which is likewise pierced by vertical slots and provided with vertical vanes, the two plates being arranged so that their respective vanes turned towards the exterior of the electrode.

In a membrane cell equipped with this particular embodiment of the electrode according to the invention, the gas produced simultaneously on the surface of the two plates facing to the outside of the electrode is collected within the box defined between the two plates, from where it is evacuated from the cell. This embodiment of the electrode according to the invention thus avoids the presence of gas in the electrolyte circulating between the anodes and the cathodes, in the cell, which, all other things also being equal, provides the advantage of reducing the electrical resistance of the electrolyte between the electrodes and of suppressing mechanical action on the membrane through erosion by the gas; furthermore it allows reduction of the anode-cathode distance with, as advantageous consequence a further reduction in the electrical resistance of the electrolyte layer between the anodes and the cathodes.

BRIEF DESCRIPTION OF THE DRAWINGS

Features and details of the invention will become evident from the following description of the appended Figures, which represent, by way of non-limiting examples, several specific embodiments of the electrode and of the membrane-type electrolytic cell according to the invention.

DESCRIPTION OF THE PREFERRED EMBODIMENTS

Figure 1:
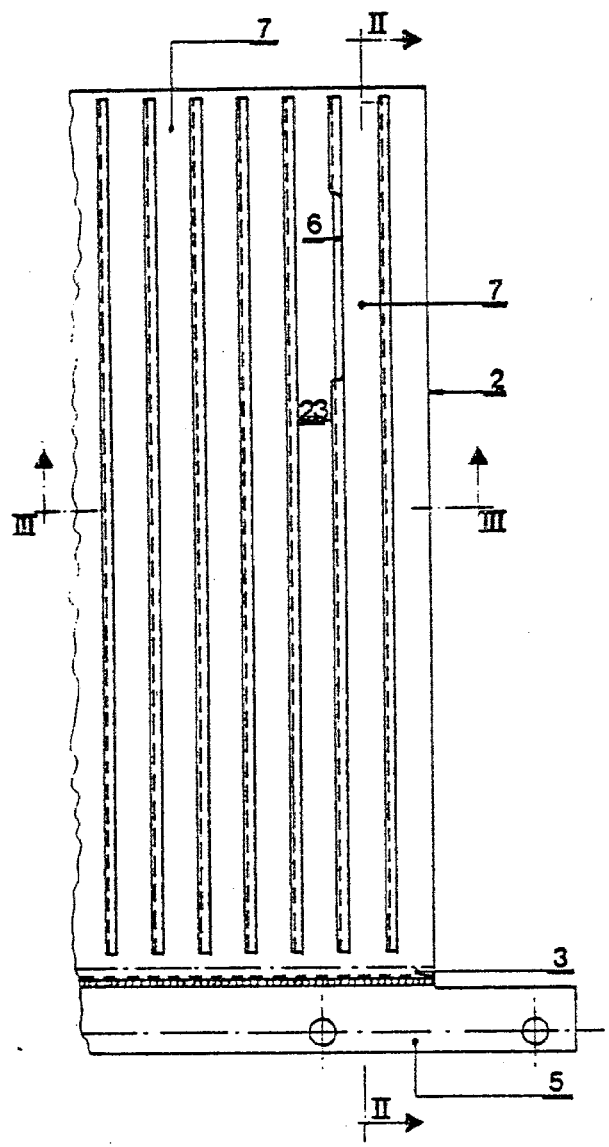
FIG. 1 shows, in elevation, partially cut-away, a first embodiment of the electrode according to the invention.

In these figures, the same reference numerals indicate identical elements.

Figure 2:
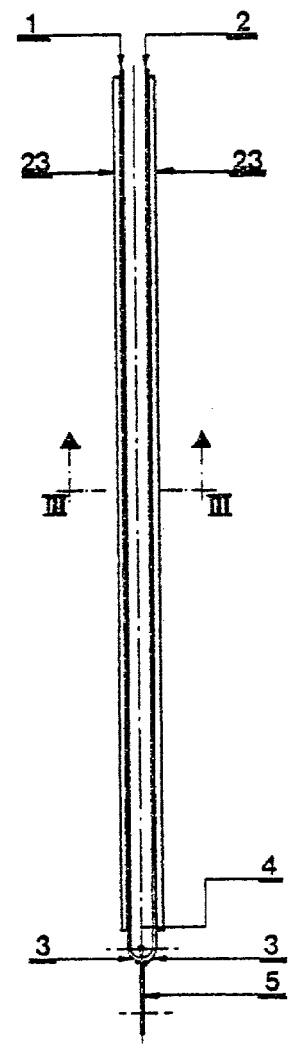
FIG. 2 is a section in the plane II—II of FIG. 1.

In a first embodiment, shown in FIGS. 1 and 2, the electrode according to the invention comprises a pair of vertical metal plates 1 and 2, joined together along their lower horizontal marginal zone 3 by a metal connecting strip 4. A metal strip 5, welded along the length of the mid zone of the strip 4, serves for connecting the electrode to a horizontal current lead, in an electrolytic cell with vertical electrodes.

According to the invention, the plates 1 and 2 are pierced, at regular intervals, by vertical slots 6, distributed uniformly over the width of the plates 1 and 2, so as to delimit between the slots continuous vertical strips 7 of metal, of equal width, extending approximately over the whole height of the vertical plates 1 and 2. Plates 1 and 2 carry vertical vanes 23 along the slots 6, these vanes being turned obliquely so as to project in front of the slots 6, outside the electrode. The vanes 23 of each plate 1, 2 are preferably all turned in the same direction and parallel to each other, making for example an angle with the general plane of the plate 1, 2 between 30 and 70 degrees.

In the electrode of FIGS. 1 and 2, the vanes 23 may be built on, for example welded, to the plates 1 and 2. Alternatively they may be formed by bending the parts of the strips 7 that lie between the vertical slots 6.

The plates 1 and 2 and the vanes 23 should be made of a material which is resistant to corrosion in contact with the electrolyte and products of electrolysis.

The material of which plates 1 and 2 are made is in addition chosen so as to permit a specific electrolytic reaction, with production of gas, on the surface of the vertical strips 7 which faces towards the exterior of the electrode.

Thus, when the electrode of FIGS. 1 and 2 is intended for an anodic reaction with production of chlorine or oxygen, for example in a process of electrolysing water, a brine or a solution of hydrochloric acid in a cell with a diaphragm or a perm-selective membrane, the plates 1 and 2 and their continuous strips 7, the vanes 23, the connecting plate 4 and the central strip 5 may advantageously be made of titanium, the surface of the strips 7 facing towards the exterior of the anode then being covered by a conducting coating securing the anodic reaction, for example a coating comprising a mixture of ruthenium oxide and titanium dioxide. In a modification, the surface of the vanes 23 facing towards the exterior of the anode may also be covered with a coating securing the anodic reaction.

When the electrode of FIGS. 1 and 2 is intended to serve as cathode for the production of hydrogen in an electrolytic process, it may be made entirely of steel or of nickel.

In the electrode shown in FIGS. 1 and 2, the slots 6 cut through the plate 1 may be arranged opposite to the slots 6 cut in the plate 2.

Figure 3:
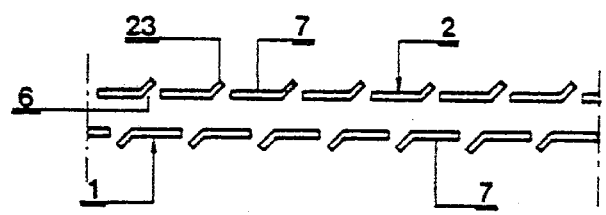
FIG. 3 is a partial section, in the plane III—III of FIG. 1, of a modified embodiment of the electrode of FIGS. 1 and 2.

In a modified embodiment, shown in FIG. 3, of the electrode of FIGS. 1 and 2, the slots 6 of the plate 1 alternate with the slots 6 of the plate 2.

Figure 4:
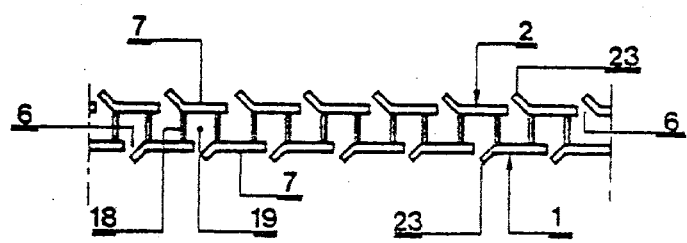
FIG. 4 is a view analogous to FIG. 3 of another modified embodiment of the electrode of FIGS. 1 and 2.
Figure 8:
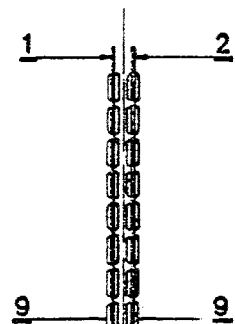
FIG. 8 is a partial view of elevation of the electrode of FIGS. 5-7.
Figure 7:
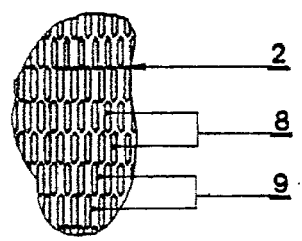
FIG. 7 is a partial section in the plane VII—VII of FIG. 5.
Figure 6:
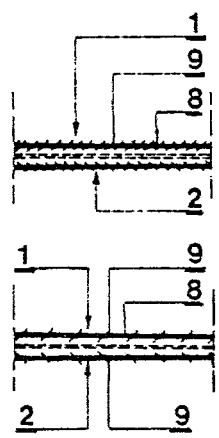
FIG. 6 is a partial section in the plane VI—VI of FIG. 5.
Figure 5:
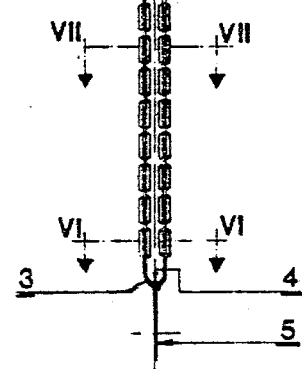
FIG. 5 is a section analogous to FIG. 2 of a second embodiment of the electrode according to the invention.

In a modification, shown in FIG. 4, of the electrode of FIG. 3, the vertical strips 7 of the plate 1 are connected to the vertical strips 7 of the plate 2 by transverse vertical partitions 18 defining between them and the two plates 1 and 2 vertical channels 19 facing the slots 6.

In the embodiment shown in FIGS. 5–8, the two vertical plates 1 and 2 of the electrode are each pierced by vertical rows of vertical slots 8 distributed uniformly over the surface of the plate. The slots 8 of each row of slots alternate with the slots 8 of contiguous rows, so as to delimit metal strips 9 between them. These strips are bent around their vertical axis so as to form vanes that are disposed obliquely with respect to the general plane of the plate 1, 2 and project in front of the slots 8 towards the exterior of the electrode.

The plates 1 and 2 pierced by slots 8 and the vanes 9 may be formed by expanded metal.

Figure 9:
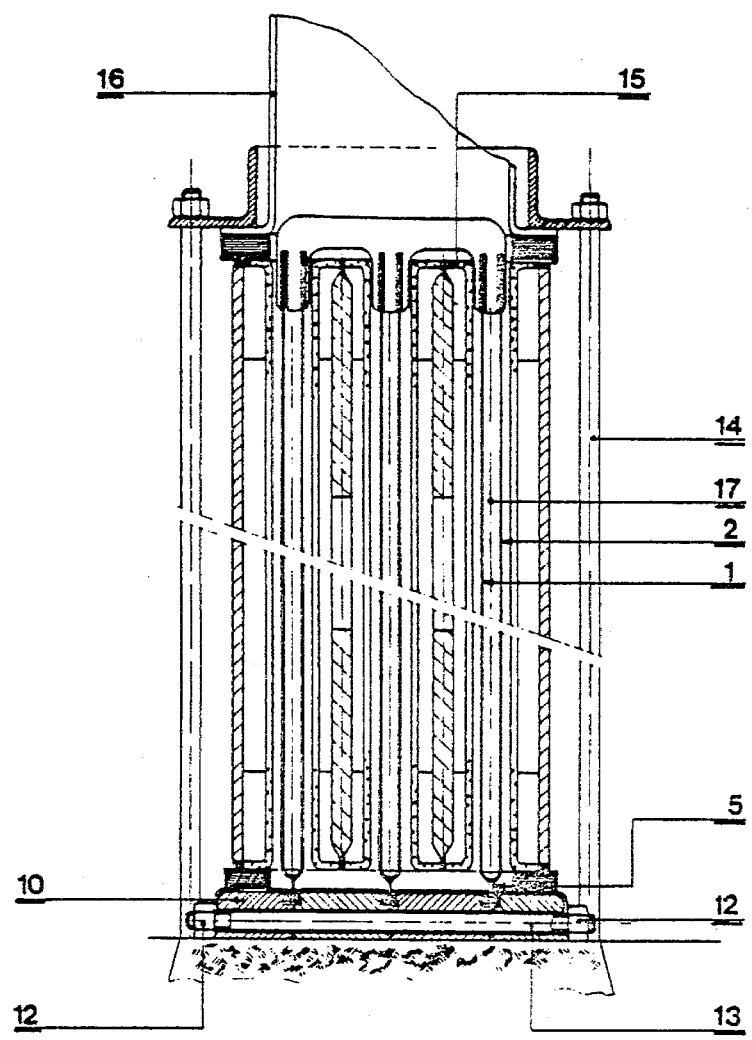
FIG. 9 shows in transverse vertical section one particular embodiment of the membrane cell according to the invention.

In FIG. 9 there is shown a diaphragm cell suitable for the electrolysis of a sodium chloride or potassium chloride brine and equipped with anodes of the type described above with reference to FIGS. 1 and 2. In the interest of clarity, the oblique vanes 23 of the anodes are not shown.

The cell of FIG. 9 comprises, in known manner, an anode assembly made up of a series of horizontal beams 10 made of copper or aluminium, between which are inserted the aforesaid central strips 5 of the anodes, the plates 1 and 2 of which are thus arranged vertically.

The horizontal beams 10 serve as current leads to the plates 1 and 2 of the anodes, by way of their lower horizontal marginal zone 3.

The beams 10 and the anodes are put together in a rigid unitary assembly, by means of nuts 12 screwed on to the ends of threaded rods 13 which pass through the beams 10 and the central strips 5 of the anodes. An assembly of this type has been described in French Pat. Application No. 75/13313, of Apr. 25, 1975, in the name of the present applicant.

At its periphery, the anode assembly of the cell of FIG. 9 carries a steel casing 14 supporting cathode pockets 15 that have foraminate walls covered by a diaphragm (not shown). The cathode casing 14 is surmounted by a cover 16 closing the cell.

During operation of the cell, the chlorine gas produced on the external surfaces of the plates 1 and 2 of the anodes passes into the space 17 within the anodes, rises in this space and escapes underneath the cover 16, from where it is extracted from the cell. The presence of chlorine gas in the current of brine circulating between the anodes and the diaphragm is thus avoided.

In a modification (not shown) of the cell of FIG. 9, the cell is equipped with a per-selective membrane, such as a NAFION membrane (E. I. Du Pont de Nemours and Co.). A membrane cell of this type, fed simultaneously with brine into the anode compartment and with water into the cathode compartment produces chlorine, hydrogen and an aqueous solution of sodium hydroxide practically free from sodium chloride.

Figure 10:
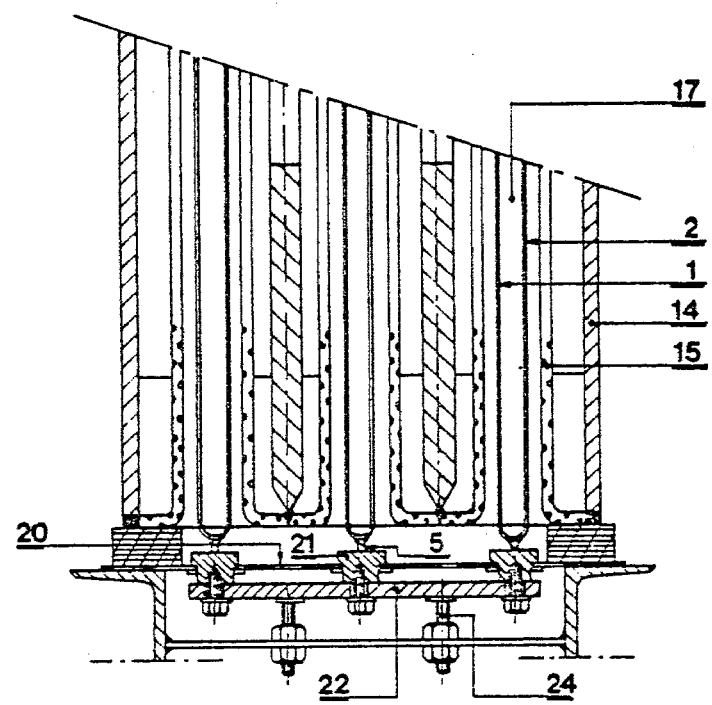
FIG. 10 shows in part transverse vertical section another embodiment of the cell according to the invention.

In a modified embodiment, shown in FIG. 10, the cell is closed, at its lower part, by a base plate 20, for example of titanium. The central strips 5 of the anodes are welded at regular intervals on to cylindrical pins 21 made of titanium, which pass through the base plate 20 and are supported on a metal bar 22 placed beneath the base plate 20 and resting on supports 24. The bar 22, which may advantageously be made of copper or aluminium serves both as current lead-in to the anodes and as supporting member for the anodes and for the base plate 20.

An anode assembly of this type is described in more detail in Belgian Pat. No. 806280 of Oct. 19, 1973, in the name of the present applicant.

Various modifications may clearly be made in the electrodes and in the cell, which have been described only by way of non-limiting examples, without departing from the scope of the invention.

We claim:

1. In an electrolytic cell of the membrane type having at least two vertical electrodes comprising an anode and a cathode, a membrane between the anode and the cathode, at least one of both said anode and said cathode comprising a vertical conductive plate, said plate having a horizontal zone for connecting an electrical lead thereto, said plate having vertically extending narrow slots distributed thereon, the slots comprising vertical elongated slots, said plate having vertically disposed elongated vanes extending obliquely from an active face of said plate and disposed adjacent ones of the vertical elongated slots, each of said vanes being disposed opposite a corresponding slot substantially in parallel vertical rows, and said vertical elongated slots and said vertical vanes being disposed effectively to transfer gas from the active face of the plate to a rear side of the plate and thus avoid bubbles of gas in an anode-cathode gap between the anode and the cathode and effective to reduce composition of electrical energy during electrolysis.

2. In an electrolyte cell according to claim 1, in which the vanes each have on their surface remote from said slots an electrically conducting coating made of a material selected from the group consisting of platinum, iridium, osmium, palladium, rhodium, ruthenium, the alloys of these metals and the compounds of these metals.

3. In an electrolyte cell according to claim 1, in which said plate and the vanes are of a common material, said material selected from the group consisting of titanium, or tantalum, or tungsten or niobium, or zirconium, or the alloys of these materials.

4. In an electrolyte cell according to claim 2, in which the vanes on said plate make an angle of substantially between 10° and 80° with a general plane of the corresponding plate.

5. In an electrolyte cell according to claim 1, in which said plate and the vanes thereon are made of iron, or nickel or the alloys thereof.

6. In an electrolyte cell according to claim 1, in which said vanes make an angle of substantially between 30° and 70° with the general plane of the plate.

7. In an electrolyte cell according to claim 1, in which said plate is provided on its active face with a conductive coating made of a material selected from the group consisting of platinum, iridium, osmium, palladium, rhodium, ruthenium, the alloys of these metals and compounds of these metals.

* * * * *